US 6,670,604 B1

(12) United States Patent
De Maria et al.

(10) Patent No.: US 6,670,604 B1
(45) Date of Patent: Dec. 30, 2003

(54) LIGHT DETECTION EQUIPMENT IN COMPONENTS WITH OPTICAL ACCESS

(75) Inventors: Letizia De Maria, Milan (IT); Alessio Martinelli, Piacenza (IT)

(73) Assignee: CESI Centro Elettrotecnico Sperimentale Italiano Giacinto Motta S.p.A., Milan (IT)

( * ) Notice: Subject to any disclaimer, the term of this patent is extended or adjusted under 35 U.S.C. 154(b) by 11 days.

(21) Appl. No.: 09/588,676

(22) Filed: Jun. 6, 2000

(30) Foreign Application Priority Data

Jun. 7, 1999 (EP) .............................. 99830352

(51) Int. Cl.⁷ .................................................. H01J 5/02
(52) U.S. Cl. .................................. 250/239; 250/227.24
(58) Field of Search .............................. 250/216, 239, 250/227.11, 227.24; 385/43, 53, 134, 33, 35, 38, 88, 92, 93; 356/241.1, 237.1

(56) References Cited

U.S. PATENT DOCUMENTS 5,586,207 A * 12/1996 Goodwin ..................... 385/92
5,744,805 A * 4/1998 Raylman et al. ......... 250/370.01
6,246,045 B1 * 6/2001 Morris et al. ............... 250/216
6,288,644 B1 * 9/2001 Mathews et al. ........... 340/555
6,415,087 B1 * 7/2002 Yang et al. ................. 385/123

FOREIGN PATENT DOCUMENTS

| DE | 19617193 A1 | | 11/1996 | |
| EP | 0899547 A1 | | 3/1999 | |
| JP | 10-090419 | * | 4/1998 | ............. G01T/1/20 |

* cited by examiner

Primary Examiner—Edward J. Glick
Assistant Examiner—Chin-Cheng Glen Kao
(74) Attorney, Agent, or Firm—Jacobson Holman PLLC

(57) ABSTRACT

A light detection equipment in a component with at least one optical access includes a light conveyor having a first terminal part faced inside the component through an optical access. The first terminal part is formed by a spherical cap collecting the light arriving from any angle inside the component. The light conveyor has a second terminal part with a surface faced and substantially in contact with a sensitive element of an optical transducer.

3 Claims, 2 Drawing Sheets

LIGHT DETECTION EQUIPMENT IN COMPONENTS WITH OPTICAL ACCESS

FIELD OF THE INVENTION

The present invention relates to a light detection equipment in components with optical access.

BACKGROUND OF THE INVENTION

One of the operating ranges of the light detection equipment is that of the control of industrial components formed by a hermetically closed metallic envelope, which have one or more optical accesses for the inspection and contains devices of different nature. In the electric case, said industrial component may be, for example, a sheathed conductor that is formed by a medium or high voltage conductor that is enclosed in a metallic pipe representing the envelope, or by a current/voltage transformer that is enclosed in a hermetic metallic chamber. The space among above-mentioned devices and the internal walls of the envelope where such devices are located can be empty or filled up with fluids, even in pressure, which are transparent to the light and which insulate totally such devices as, for example, the sulphur hexafluoride in sheathed conductors and the oil in transformers.

Since the defects that said industrial components show, which are due for example to material ageing phenomena or to imperfection presence or to dirt, a degradation of the electric industrial component insulation happens which is correlated with light phenomena, even of minimum intensity (at least at the beginning). Such light phenomena which are an index of damage in the same industrial component, must be detected so that a phenomenon identification can be obtained and also, when it is necessary, a repair or replacement of the industrial component can be made.

The light intensity that arrives at the internal surfaces of the containment envelope can change from $10^{-16}$ Watt/cm$^2$ to $10^{-9}$ Watt/cm$^2$; according to that, the technology used for the emitted light detection can change from photon count to analog detection measured continuously).

The light intensity that arrives at the internal surfaces of the containment envelope can change from $10^{-16}$ Watt/cm$^2$ to $10^{-9}$ Watt/cm$^2$; according to that, the technology used for the emitted light detection can change from photon count to analog detection (measure in continue).

The main features that a detection device of such type must have are:
  high sensibility of luminous phenomenon detection
  high signal/noise ratio
  rapidity of measure (maximum measure times in the order of the minute)
  immunity to electromagnetic interferences and mechanical troubles (for example vibrations)
  modularity of the system
  remote control of the optical probe
  compactness of the optical probe
  simplex installation of the optical probe in the optical access
  simplex use of the system Presently three different types of equipment for light radiation detection in industrial components with optical access are essentially known.

A first equipment uses an optical fiber with large diameter of nucleus (usually an optical fiber with a liquid nucleus of 4.5 mm in diameter), which faces on the optical access window and carries the light arriving from inside the component to the sensitive area of a photomultiplier tube located to about two meters from the component. The optical fiber is not very efficient to collect the light from all the angles (usually it shows a good efficiency only on acceptance angles that do not overcome +/−34° with respect to its optical axis), therefore a special joint must be used that orients the optical fiber according a prefixed angle with respect to a predetermined axis. The electric signal arriving from the photomultiplier tube is subsequently processed in order to obtain the information deriving from the light radiation intensity.

A second equipment uses a photomultiplier tube directly faced to the optical access window in order to detect the light arriving from inside the component. The electric signal arriving from the photomultiplier tube is subsequently processed in order to obtain the information deriving from the light radiation intensity.

A third equipment uses a cylindrical light conveyor, which ends with a concave conical surface, which penetrates into the component and collects the light arriving from 0° and 90° angles with respect to the axis of the same conveyor. The light emerges from the light conveyor and is conveyed in an optical fiber beam arriving at a sensor (for example a photodiode).

The first equipment requires the presence of an operator to orient the joint and therefore requires very long measure times, often not compatible with the measure type that must be effected. Also, if the length of the optical fiber used overcomes two meters and the light source emits mainly in a radiation field next to UV band, a notable attenuation of the collected light happens. At the end such equipment shows a so high cost that is not possible to use this equipment in industrial scale.

The second equipment shows a minor efficiency because the photomultiplier tube is placed outside the optical access window, and this allows a notable reduction of the light collecting angles.

The third equipment does not allow to collect the light sinking the cylindrical element at angles that are significantly different from 0° and 90°. Also such equipment does not convey the light in the optical fiber beam in efficient way.

SUMMARY OF THE INVENTION

In view of the state of the art described, it is an object of the present invention to show a light detection equipment that allows to detect the light arriving from any angles and which has a very high sensitivity, even at very low luminous intensity levels, allowing very fast measure times.

According to the present invention, such object is attained by a light detection equipment in a component with at least one optical access, characterized by comprising light conveyor means having a first terminal part faced inside said component through said optical access, said first terminal part being formed by a spherical cap collecting the light arriving from any angle inside said component, said light conveyor means having a second terminal part with a surface faced and substantially in contact with a sensitive element of an optical transducer.

Thanks to the present invention it is possible to form an equipment for light detection in components with optical access that allows to detect the light arriving from any angle and to minimize the measure times by a very high sensitivity, even at very low luminous intensity levels, and which also shows reduced size to allow its use in industrial structures.

BRIEF DESCRIPTION OF THE DRAWINGS

The features and the advantages of the present invention will be made evident by the following detailed description of an embodiment thereof, illustrated as not limiting example in the annexed drawings, wherein.

DETAILED DESCRIPTION OF THE PREFERRED EMBODIMENTS

Figure 1:
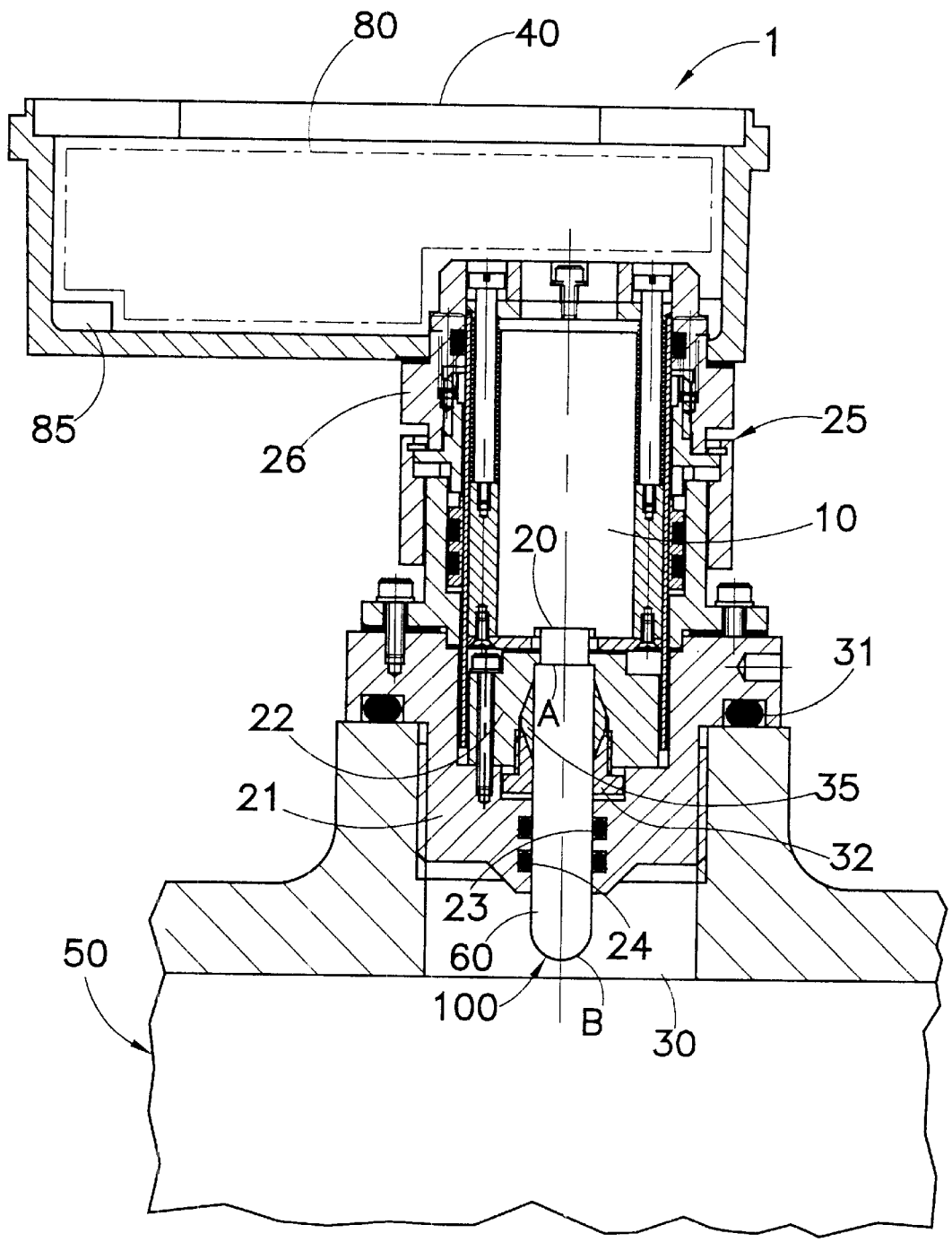
FIG. 1 is a cross-sectional view of a light detection equipment according to an embodiment of the present invention.

With reference to FIG. 1 a light detection equipment 1 according to the invention is shown. Said equipment comprises a light conveyor 100 adapted to convey the light to a sensitive element 20 of a photomultiplier 10. Said conveyor faces, through an optical access 30, inside a sheathed and insulated electric component which contains sulphur hexafluoride in pressure and is usually called GIS (Gas Insulated System).

Figure 2:
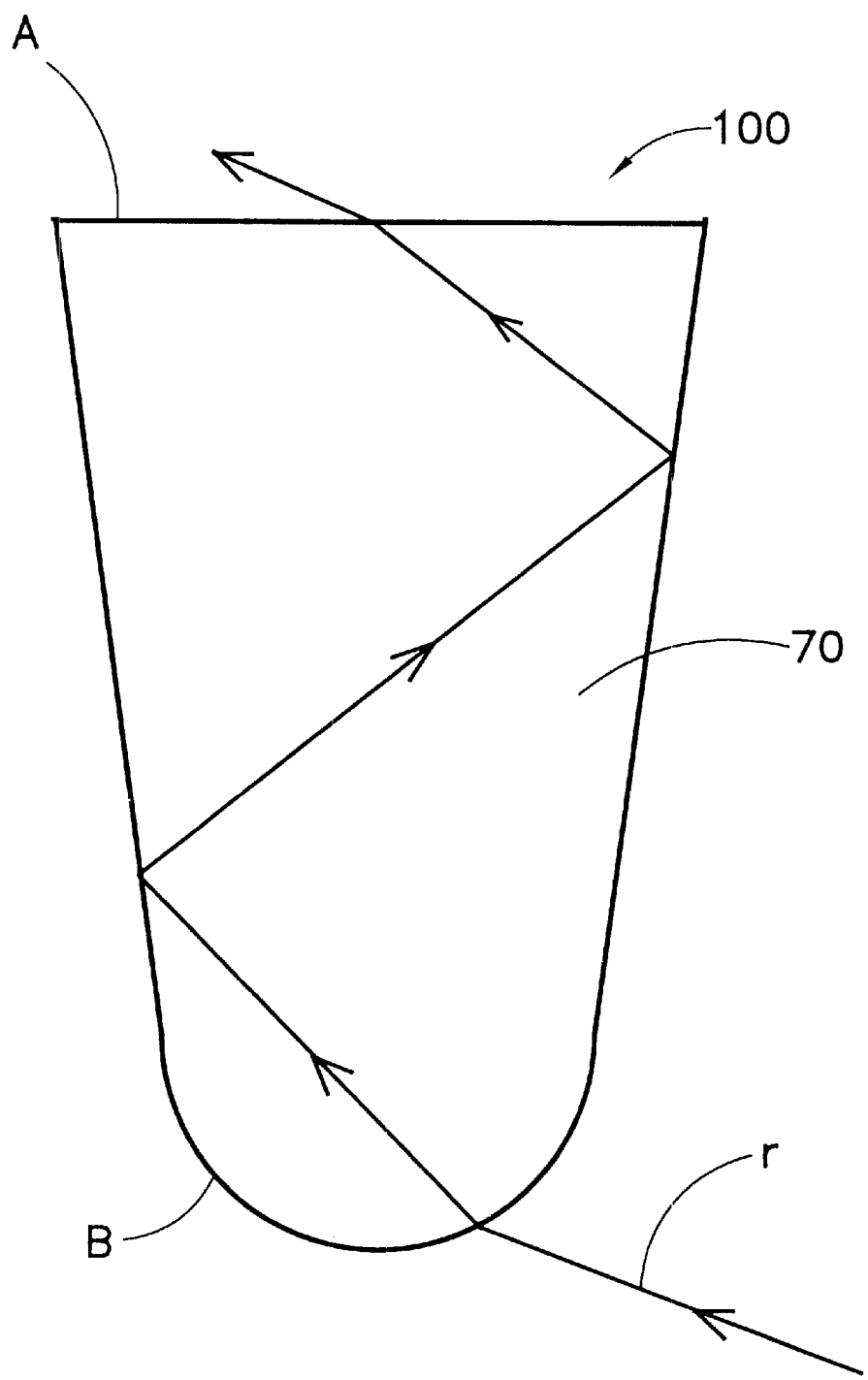
FIG. 2 shows in enlarged scale a variant of the light conveyor of the detection equipment according to the invention.

The light conveyor 100 is formed by a cylindrical body 60 (for example a quartz or an other material transparent to ultraviolet rays) or, as described in FIG. 2, by a similar frustum-cone body 70. The light conveyor 100 is located inside a container 21–22 so that the space between conveyor 100 and container 21–22 is air or an other mean that can define an interface with refraction index lower than that of the same conveyor. Said container 21–22 is screwed in the optical access 30 and has sealing rings 23, 24. The light conveyor 100 ends, in its part faced to the electric component 50, with a spherical cap B which collects the light r arriving from inside the explored ambient, under a solid angle next to 2π steradians. The opposite surface A of the light conveyor 100, which in the case of the conveyor with frustum-cone body is the base surface, is instead faced and substantially in contact with the sensitive element 20 of the photomultiplier 10. The light r, which is collected by the spherical cap B, is so conveyed to the sensitive element 20 of the photomultiplier 10 without any dispersion, but with a total reflection inside the same conveyor.

The light conveyor 100 is provided with means that can guarantee a hermetic seal at the lateral walls of the container 21–22. Particularly said hermetic seal is formed at the walls of the lower part 21 of the container by two sealing rings 23 and 24, and at the higher part 22 of the container by a teflon ogive 35 that is held in position by a metallic compass 32 screwed in the higher part 22 of the container to exercise the necessary compression on said teflon ogive 35. There is also provided a sealing ring 31 between the part 21 of the container 21–22 and the face of the electric component 50. The light conveyor 100 must be formed totally in material transparent to the light that must be detected. The lateral surface of the conveyor can also be covered by a reflecting material deposition allowing to avoid its accidental dirties. Said accidental dirties could locally allow light emissions from the lateral surface of the light conveyor 100 and therefore could reduce the useful signal arriving at the sensitive element 20 of the photomultiplier 10.

The photomultiplier 10 is directly coupled, by a fast easily detachable connection, to the light conveyor 100 so that the distance between the superior surface A and the sensitive element 20 is minimum, for example 1 mm. So the loss of light r arriving from the light conveyor 100 can be minimized. According to a preferred embodiment the photomultiplier 10 is inserted in a container 26 and is set up on the container 21–22 of the light conveyor 100 by a fast bayonet connection 25 to allow a fast replacement of the sensor with other types of optical sensors, when measures different from these of partial discharge detection must be effected.

The container 26 of the photomultiplier 10 is integral with a hermetic box 40, which is according to rule IP65 and is electromagnetically shielded, which box contains the signal amplification and discrimination electronics generally indicated with the numeric reference 80. In this particular embodiment of the invention, batteries not shown in FIG. 1 are inserted inside the box 40 and give power supply to the electronics and the photomultiplier 10, but generally the power supply can be given by a low voltage electric line (+/−9 V). Also inside the box 40 a optical data transmitter 85 fed from the electronics 80 is present.

Downstream to the transmission chain a remote system for data acquisition and processing is employed by means of a calculator and a suitable interface. The known photon counter technology must be used to detect partial discharges by correlating the photon detection with the 50 Hz supply of the GIS module.

What is claimed is:

1. A light detection equipment for an industrial component having a hermetically closed envelope provided with at least one optical access for internal inspection, said light detection equipment comprising a light conveyor formed by a single-piece frustum-conical structure of a material transparent to light radiation to be detected, said single-piece frustum-conical structure having a minor terminal face with a spherical cap, a major terminal face and a frustum-conical lateral surface, an optical transducer having a sensitive element arranged in front of and closely facing said major terminal face of the light conveyor, a first container to support the light conveyor and arranged around the lateral surface of the light conveyor, and interface means interposed between the lateral surface of the light conveyor and said first container to define an interface with a refraction index lower than that of the light conveyor so as to cause total internal reflection of light from said lateral surface of the light conveyor, said first container being provided with connecting means for being sealingly mechanically externally connected to said optical access of the industrial component with the spherical cap of the minor terminal face of the light conveyor arranged inside the optical access to be frontally and laterally exposed to and to receive light coming from said component.

2. A light detection equipment according to claim 1, wherein said optical transducer is a photomultiplier.

3. A light detection equipment according to claim 2, wherein said photomultiplier is inserted in a housing defined inside an electromagnetically shielded bayonet joint arranged between said first container and a second container which is electromagnetically shielded and contains signal amplification, discrimination and optical transmission electronics.

* * * * *